March 30, 1954 — J. F. SHIRK — 2,673,770
PISTON RING
Filed Jan. 24, 1951
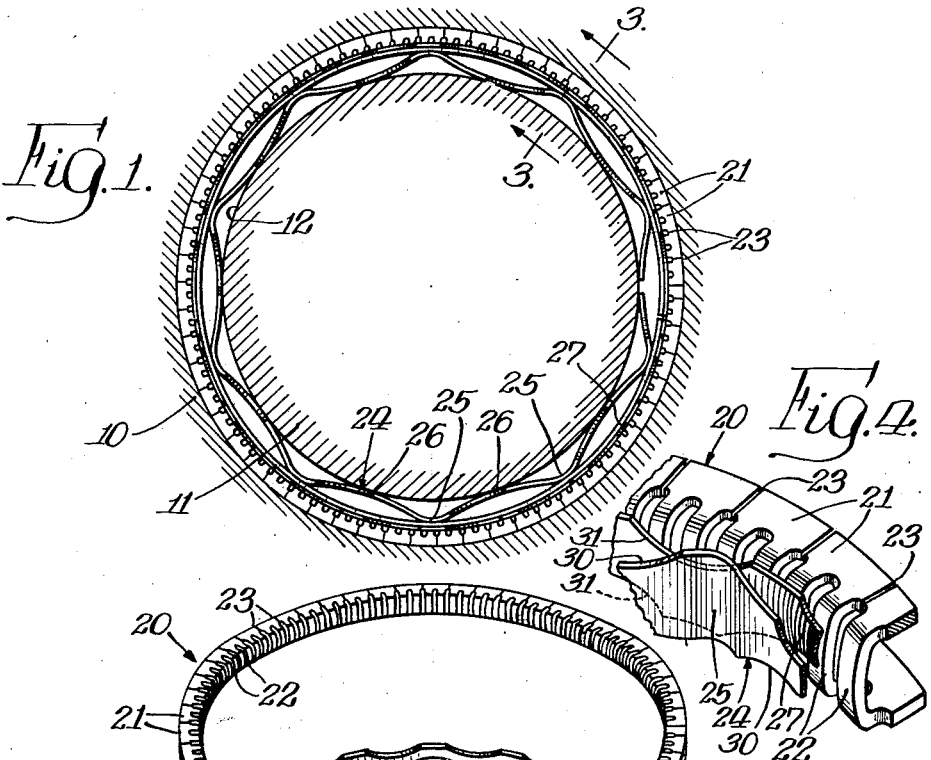
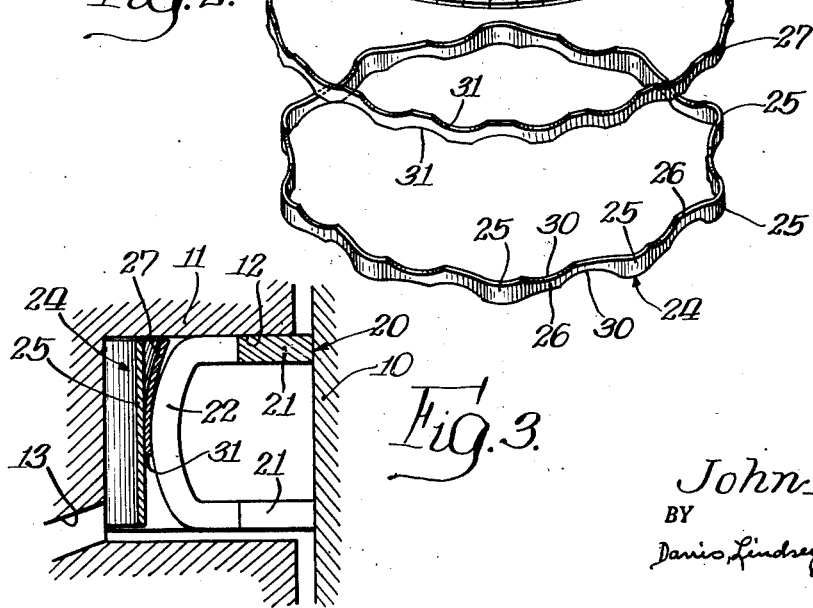
INVENTOR.
John F. Shirk,
BY
Davis, Lindsey, Hibben & Noyes
Attys.

Patented Mar. 30, 1954

2,673,770

UNITED STATES PATENT OFFICE 2,673,770

PISTON RING

John F. Shirk, Hagerstown, Ind., assignor to Perfect Circle Corporation, Hagerstown, Ind., a corporation of Indiana Application January 24, 1951, Serial No. 207,496

6 Claims. (Cl. 309—29)

The invention relates generally to piston rings and more particularly to a piston ring assembly adapted to serve as an oil ring in an internal combustion engine.

The general object of the invention is to provide a novel piston ring assembly comprising a highly flexible ring member and an expander, with means for distributing the expanding force of latter uniformly on the ring member throughout the length thereof.

More specifically, it is an object to provide a shim between the expander and the flexible ring member, which distributes the force exerted by the expander so that the ring member bears uniformly against the cylinder throughout the circumferential length of the ring member.

Another object is to provide a piston ring assembly adapted for use in a worn cylinder, and particularly one worn to a taper, which tends to center the piston within the cylinder and thus avoid piston slap.

Other objects and advantages will become apparent from the following description taken in connection with the accompanying drawing, in which:

Figure 1 is a fragmentary cross-sectional view of a cylinder and piston provided with a ring assembly embodying the features of the invention.

Figure 2 is an exploded view of the parts comprising the ring assembly.

Figure 3 is a sectional view taken on the line 3—3 of Figure 1.

Figure 4 is a fragmentary perspective view of the ring assembly.

A ring assembly embodying the features of the invention is adapted for use as an oil ring in connection with a piston and cylinder such as in an internal combustion engine, and in the drawing the cylinder is fragmentarily illustrated at 10 and the piston at 11. The latter is provided with a groove 12 (see Fig. 3) to receive the ring assembly and, since the ring assembly is adapted to serve as an oil ring, the groove 12 is illustrated as provided with one or more drain passages 13 to return the oil removed from the cylinder wall by the ring to the crankcase of the engine.

The ring assembly comprises a ring member which is of a highly flexible character so that it will readily conform to the shape of the cylinder wall. This characteristic of the ring member is of particular advantage when the ring assembly is used in a worn cylinder. A ring member which is of such a construction as to be highly flexible usually cannot exert a high inherent expansive force because the features rendering it flexible lessens its inherent ability to expand. However, by providing an expander acting on the ring member, both flexibility and a strong expansive force may be obtained, so that the ring assembly readily adapts itself to irregularities occurring in a worn cylinder.

One of the most satisfactory types of expanders for piston rings is the so-called hump spring comprising a strip of spring metal bent to provide a plurality of circumferentially spaced points adapted to bear against the bottom of the ring groove and other points in alternate relation with the first-mentioned points adapted to bear against the ring member. While this type of expander provides the desired expansive force, such force would be applied to the ring member at spaced points and, because of the high flexibility of the ring member, the latter would bear against the cylinder wall with greater pressure at such points than at the portions lying between such points.

The present ring assembly avoids this disadvantage by providing means for distributing the force of the expander throughout the circumferential length of the ring member so that the latter exerts substantially uniform pressure against the cylinder wall throughout the length of the ring member. Such means is in the form of a shim interposed between the expander and the ring member and is of such construction that it occupies only a small portion of the radial depth of the groove and yet has sufficient stiffness to distribute the force exerted by the expander in the desired manner. The shim is also constructed to provide for flow of oil inwardly of the groove.

A ring member which has the flexibility contemplated may be of sheet metal construction and may comprise a pair of cylinder-engaging flanges of segmental construction integrally connected by web members, although other sheet metal constructions are suitable. If such a ring member were used alone in the groove, it would be spaced from the bottom of the groove, and if the cylinder in which it operated were worn to a taper, piston slap would occur because the ring would not hold the piston centered. The present ring assembly avoids this difficulty, since the expander bears against the bottom of the groove and holds the piston in a centered position within the cylinder, thus avoiding the slap.

In the drawing, the ring member is indicated generally at 20 and is shown as of a sheet metal construction comprising two axially spaced rows of segments 21 constituting a pair of cylinder-engaging flanges. The segments 21 are shown as being integrally connected by circumferentially spaced web members 22 extending inwardly and axially to connect the segments of one flange with those of the other flange. The segments 21 are separated by slight gaps 23 (see Fig. 4) which provide for expansion and contraction of the ring member. The ends of the ring member are in abutment when the ring is in the cylinder and the ring member is compressed so that it tends to expand to conform to the cylinder wall. However, because of the light, flexible construction, and inherent expansive force that it exerts is only moderate.

To increase its expansive force and take full advantage of its flexibility to conform to the contour of a worn cylinder, a hump spring, indicated generally at 24, is employed with the ring member. A spring of this type comprises a strip of spring metal bent at a series of spaced points, indicated at 25, thus approximating a circle. Between the points 25, the spring is bowed inwardly as at 26. When such a spring is placed within the groove 12 behind the ring member 20, the inwardly bowed portions 26 seat against the bottom of the groove, while the points 25 extend outwardly to expand the ring member.

If the points 25 bore directly against the ring member, the latter because of its flexibility would bear against the cylinder wall with a much greater force adjacent such points than at portions lying between such points.

Means for distributing the force of the spring 24 is therefore interposed between the spring and the ring member. Such means preferably comprises a shim 27 made of a strip of sheet metal and bent substantially into a circle. Such a shim occupies only a small part of the radial width of the ring groove. To stiffen the shim so that it will distribute the force exerted by the spring at the points 25 throughout the length of the ring member, the shim is curved radial cross-section as illustrated in Fig. 3. The web members 22 are easier to form, from a manufacturing standpoint, if slightly curved as shown in Fig. 3, so that the curved form of the shim 27 fits around the web members. To permit flow of oil inwardly of the groove so that the oil scraped from the cylinder wall may be returned to the crank case of the engine, the spring 24 is notched as at 30 along both edges of the strip in the portions 26, and the shim is similarly notched as at 31.

With a ring assembly of the foregoing construction full advantage is taken of the flexible character of the ring member 20 by augmenting its inherent expansive force by the expansive force of the spring 24. The shim insures distribution of the pressure of spring throughout the circumferential length of the ring member so that the latter has a substantially uniform pressure against the cylinder wall. Thus, the ring assembly is particularly useful with worn cylinders and, since the ring member is centered relative to the piston by the spring bearing against the bottom of the groove, the piston will be held in proper position throughout its stroke, in the case of cylinders worn to a taper, so that no piston slap occurs.

I claim:

1. A piston ring assembly comprising a cylinder engaging sheet metal ring member of the circumferentially expansible type, a hump spring adapted to bear against the back of the piston ring groove for expanding the ring member, and a shim interposed between and engaging the ring member and the hump spring to distribute the force exerted by the hump spring throughout the length of the ring member.

2. A piston ring assembly comprising a cylinder-engaging ring member formed from a strip of sheet metal punched and folded to render it highly flexible, spring means adapted to bear against the back of the piston ring groove and having circumferentially spaced points for exerting expansive pressure, and a shim interposed between said spring means and said ring member for distributing the pressure exerted at said points throughout the length of the ring member.

3. A piston ring assembly comprising a ring member having cylinder-engaging flanges comprising a plurality of segments and web members connecting the segments, a hump spring for expanding the ring member, and a shim interposed between the spring and the ring member and bearing against said web members for distributing the expansive force exerted by the spring substantially uniformly throughout the length of the ring member.

4. A piston ring assembly comprising a flexible ring member, a hump spring having circumferentially spaced portions adapted to engage the back of the ring groove and other circumferentially spaced portions alternately arranged with the first-mentioned portions for expanding the ring member, and a shim interposed between said members for uniformly distributing the expanding force of the spring on the ring member throughout the length of the latter, said shim comprising a strip of metal curved in radial cross section to stiffen it and thereby render it capable of so distributing the expanding force.

5. A piston ring assembly comprising a flexible ring member, a hump spring having circumferentially spaced portions adapted to engage the back of the ring groove and other circumferentially spaced portions alternately arranged with the first-mentioned portions for expanding the ring member, and a shim interposed between said members for uniformly distributing the expanding force of the spring on the ring member throughout the length of the latter, said spring and said shim both being notched along their respective edges to provide for the flow of oil inwardly through the ring assembly.

6. A piston ring assembly adapted for use in worn cylinders, comprising a highly flexible ring member adapted to readily conform to the cylinder and having cylinder-engaging flanges comprising a plurality of segments connected by web members, a hump spring positioned within the ring member and adapted to bear against the back of the piston ring groove to center the piston within the cylinder, and a shim interposed between the ring member and the spring to distribute the expansive force of the latter uniformly throughout the length of the ring member.

JOHN F. SHIRK.

References Cited in the file of this patent

UNITED STATES PATENTS

| Number | Name | Date |
| --- | --- | --- |
| Re. 21,557 | Given | Sept. 10, 1940 |
| 1,996,782 | Zeledon | July 17, 1934 |
| 2,044,451 | Teetor | June 16, 1936 |
| 2,468,980 | Huber | May 3, 1949 |

FOREIGN PATENTS

| Number | Country | Date |
| --- | --- | --- |
| 497,823 | Great Britain | Dec. 29, 1938 |
| 498,079 | Great Britain | Jan. 3, 1939 |